United States Patent
Wang et al.

(10) Patent No.: US 9,548,694 B2
(45) Date of Patent: Jan. 17, 2017

(54) POWER GENERATOR UNIT FOR A VEHICLE

(71) Applicant: Kwang Yang Motor Co., Ltd., Kaohsiung (TW)

(72) Inventors: Chun-Kai Wang, Tainan (TW); Chao-Chang Ho, Kaohsiung (TW)

(73) Assignee: Kwang Yang Motor Co., LTD., Kaohsiung (TW)

( * ) Notice: Subject to any disclaimer, the term of this patent is extended or adjusted under 35 U.S.C. 154(b) by 10 days.

(21) Appl. No.: 14/839,195

(22) Filed: Aug. 28, 2015

(65) Prior Publication Data

US 2016/0059709 A1    Mar. 3, 2016

(30) Foreign Application Priority Data

Aug. 29, 2014  (TW) .............................. 103129956 A

(51) Int. Cl.

| | |
|---|---|
| *B60L 11/02* | (2006.01) |
| *B61C 9/38* | (2006.01) |
| *H02P 11/00* | (2006.01) |
| *B60K 1/02* | (2006.01) |
| *F02B 63/04* | (2006.01) |
| *F02B 67/04* | (2006.01) |
| *F02B 77/14* | (2006.01) |
| *F16H 47/00* | (2006.01) |
| *B60K 6/48* | (2007.10) |
| *F16H 37/02* | (2006.01) |

(52) U.S. Cl.
CPC ................ *H02P 11/00* (2013.01); *B60K 1/02* (2013.01); *F02B 63/04* (2013.01); *F02B 67/04* (2013.01); *F02B 77/14* (2013.01); *Y02T 10/7077* (2013.01)

(58) Field of Classification Search
USPC ......... 290/45; 74/730.1; 180/65.25; 475/219
See application file for complete search history.

(56) References Cited

U.S. PATENT DOCUMENTS

| | | | | |
|---|---|---|---|---|
| 5,045,027 A | * | 9/1991 | Larsen .................. | F16F 15/134 192/207 |
| 6,910,399 B2 | * | 6/2005 | Nishi ...................... | F16H 3/089 74/376 |
| 6,941,838 B2 | * | 9/2005 | Hori ........................ | F02B 61/02 192/3.21 |
| 7,198,021 B2 | * | 4/2007 | Kawakubo ............. | F16H 57/02 123/198 P |
| 7,300,382 B2 | * | 11/2007 | Yamamoto ............ | F02N 11/103 123/406.11 |
| 7,316,626 B2 | * | 1/2008 | Oishi ...................... | B62M 7/02 123/195 A |

(Continued)

*Primary Examiner* — Pedro J Cuevas
(74) *Attorney, Agent, or Firm* — Brinks Gilson & Lione

(57) ABSTRACT

A power generator unit includes a crankshaft-connecting unit and a power supply unit adapted to be arranged substantially in a left-right direction in which a crankshaft of a vehicle extends. The crankshaft-connecting unit includes a recharge generator adapted to be disposed on and actuated by the crankshaft, and a transmission shaft adapted to extend in parallel with and be driven rotatably by the crankshaft. The power supply unit includes a main shaft connected coaxially to the transmission shaft, and a supply generator connected to the main shaft and actuated by the main shaft. A portion of the transmission shaft is covered by the power supply unit.

10 Claims, 6 Drawing Sheets

(56) References Cited

U.S. PATENT DOCUMENTS

| | | | | |
|---|---|---|---|---|
| 7,401,589 B2* | 7/2008 | Oishi | F01M 11/02 | 123/196 R |
| RE42,841 E * | 10/2011 | Oishi | F01M 11/02 | 123/195 R |
| 8,056,659 B2* | 11/2011 | Oba | B60K 6/387 | 180/65.225 |
| 8,091,661 B2* | 1/2012 | Oba | B60K 6/387 | 180/65.25 |
| 8,202,181 B2* | 6/2012 | Oishi | B62M 7/02 | 474/144 |
| 2003/0136221 A1* | 7/2003 | Hori | F02B 61/02 | 74/730.1 |
| 2004/0171449 A1* | 9/2004 | Oishi | B62M 7/02 | 474/144 |
| 2005/0085329 A1* | 4/2005 | Kawakubo | F16H 57/02 | 475/219 |
| 2005/0107194 A1* | 5/2005 | Oishi | F01M 11/02 | 474/28 |
| 2005/0178594 A1* | 8/2005 | Yamauchi | B60K 6/445 | 180/65.235 |
| 2005/0288151 A1* | 12/2005 | Yamamoto | F02N 11/103 | 477/110 |
| 2006/0167713 A1* | 7/2006 | Johnson | B60K 17/28 | 180/53.8 |
| 2007/0272196 A1* | 11/2007 | Nishi | F16H 57/043 | 123/196 R |
| 2008/0032841 A1* | 2/2008 | Oishi | B62M 7/02 | 474/242 |
| 2008/0096718 A1* | 4/2008 | Oishi | F01M 11/02 | 477/44 |
| 2009/0301800 A1* | 12/2009 | Oba | B60K 6/365 | 180/65.25 |
| 2010/0044128 A1* | 2/2010 | Oba | B60K 6/387 | 180/65.25 |
| 2013/0154410 A1* | 6/2013 | Morita | B60K 6/26 | 310/71 |
| 2014/0238758 A1* | 8/2014 | Barth | B60K 6/48 | 180/65.25 |

* cited by examiner

POWER GENERATOR UNIT FOR A VEHICLE

CROSS REFERENCE TO RELATED APPLICATION

This application claims priority of Taiwanese Patent Application No. 103129956, filed on Aug, 29, 2014, the disclosure of which is incorporated herein by reference.

FIELD

The disclosure relates to a power generator unit, more particularly to a power generator unit for a vehicle.

BACKGROUND

A small utility vehicle, such as a golf cart or a side by side, etc., is generally a two-person and low-speed vehicle applied in golf courses and farms. Along with the development of electric-petroleum hybrid vehicle industries, the utility vehicle has trended to be mounted with two generators instead of just one for more fuel and power efficiency.

Referring to FIG. 1, a conventional power unit 1 of the dual-generator utility vehicle is illustrated. The conventional power unit 1 is generally adapted to be mounted under two seats of the utility vehicle, which includes an engine 12, a crankshaft 11 extending rotatably through the engine 12 in a left-right direction of the utility vehicle, a shaft case 10 containing the crankshaft 11, a first generator 13 connected to and actuated by the crankshaft 11 and disposed at a side of the engine 12, a speed-reduction mechanism 14 driven by the crankshaft 11 and disposed at another side of the engine 12 opposite to the first generator 13, and a second generator 15 connected to and activated by the speed-reduction mechanism 14. The speed-reduction mechanism 14 and the second generator 15 are arranged in an up-down direction, and the second generator 15 is disposed above said first generator 13.

However, such arrangement of the first generator 13, the speed-reduction mechanism 14 and the second generator 15 results in a relatively large height of the power unit 1, which is not suitable for the space under the two seats of the utility vehicle that is elongated in the left-right direction of the utility vehicle.

SUMMARY

Therefore, the object of the disclosure is to provide a power generator unit for a small utility vehicle that can improve space utilization.

Accordingly, a power generator unit is for a vehicle which includes a body frame and a crankshaft that extends in a left-right direction of the body frame. The power generator unit includes a crankshaft-connecting unit and a power supply unit that is connected to the crankshaft-connecting unit. The crankshaft-connecting unit and the power supply unit are adapted to be arranged in the left-right direction of the body frame. The crankshaft-connecting unit includes a recharge generator adapted to be disposed on and actuated by the crankshaft, and a transmission shaft adapted to extend in parallel with and driven rotatably by the crankshaft. The power supply unit includes a main shaft that is connected coaxially to the transmission shaft, and a supply generator that is connected to the main shaft and that is actuated by the main shaft. A portion of the transmission shaft is covered by the power supply unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION OF THE EMBODIMENT

Figure 1:
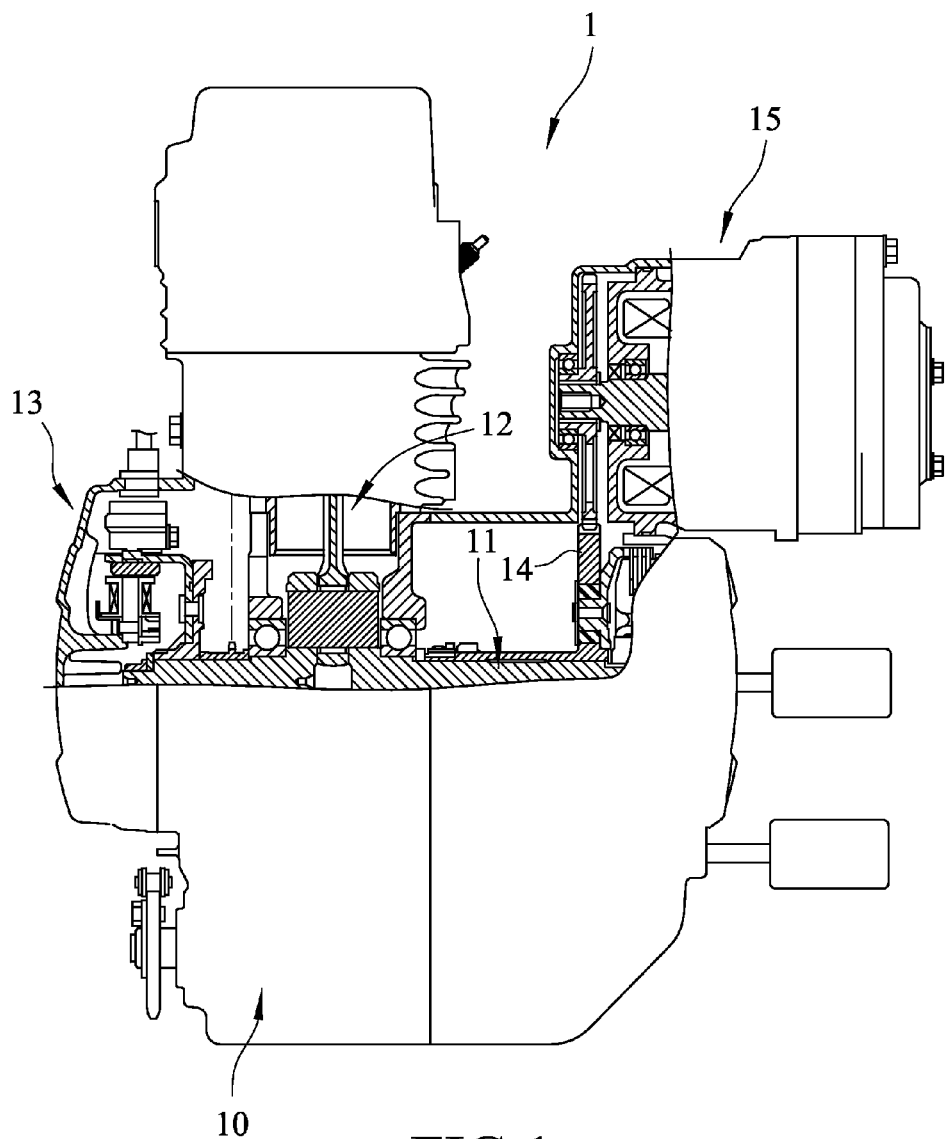
FIG. 1 is a fragmentary sectional front view illustrating a conventional power unit.
Figure 2:
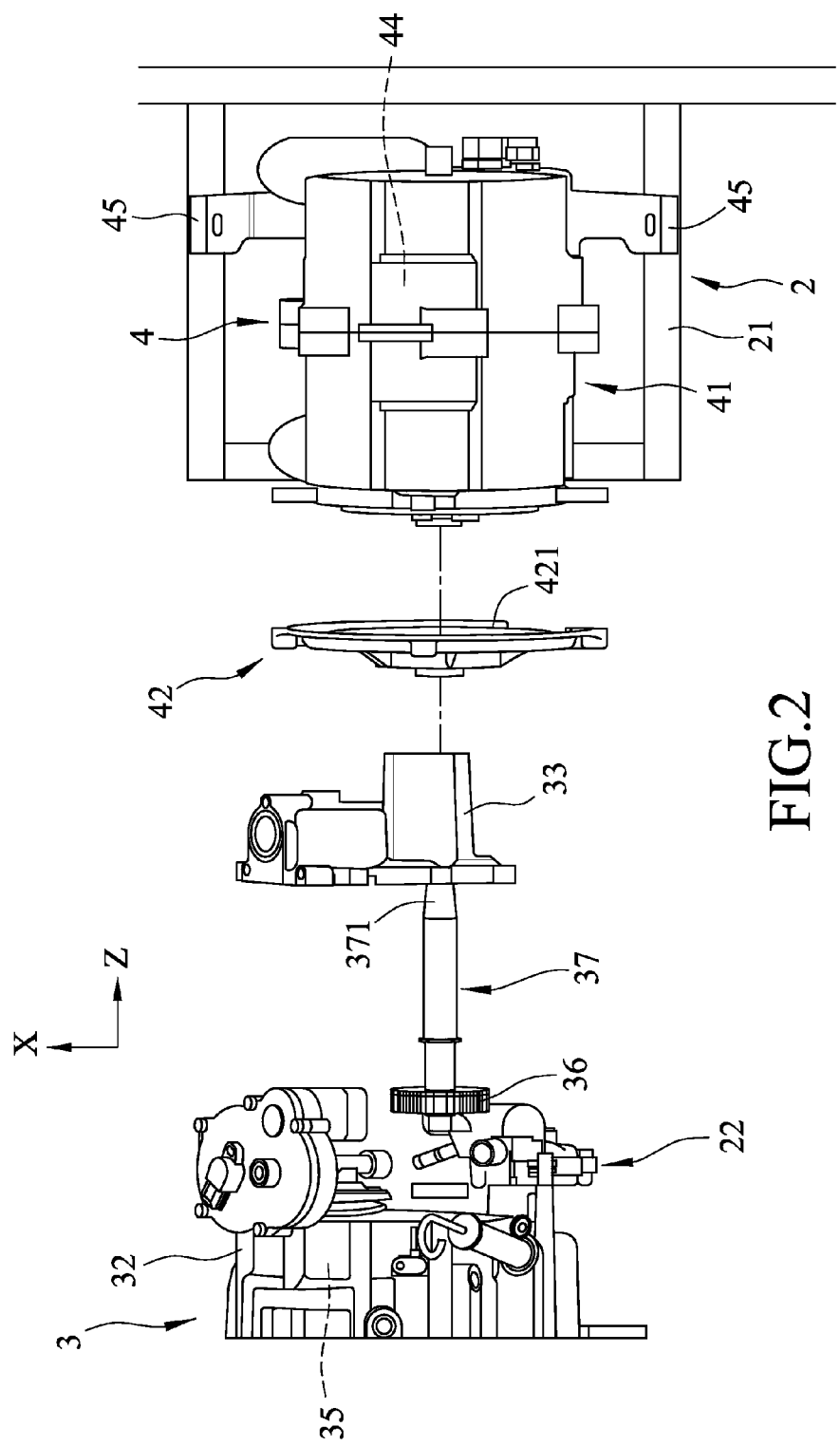
FIG. 2 is a partly exploded perspective top view illustrating an embodiment of a power generator unit according to the disclosure being installed on a vehicle.
Figure 3:
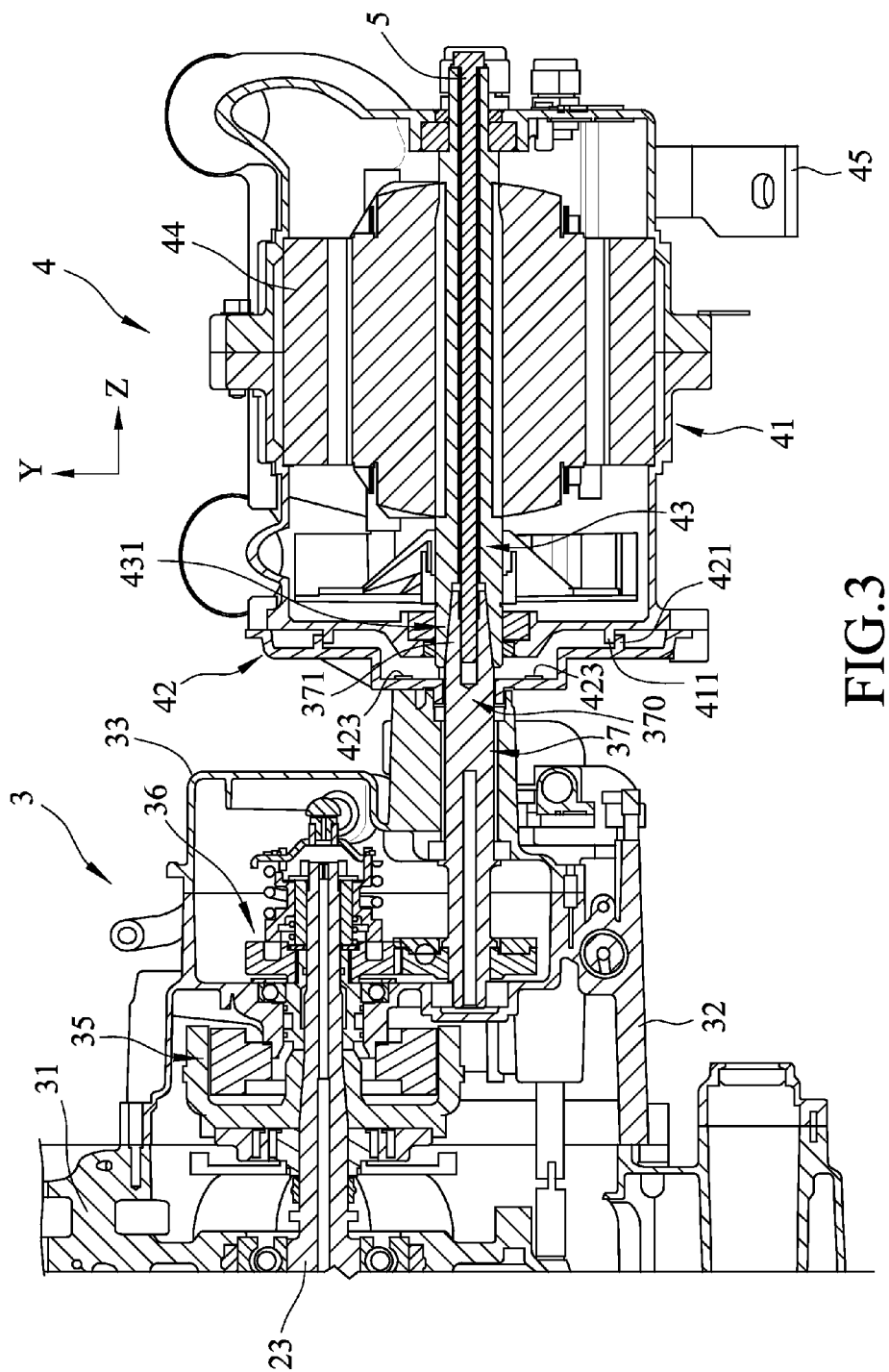
FIG. 3 is a front sectional view of the embodiment.
Figure 4:
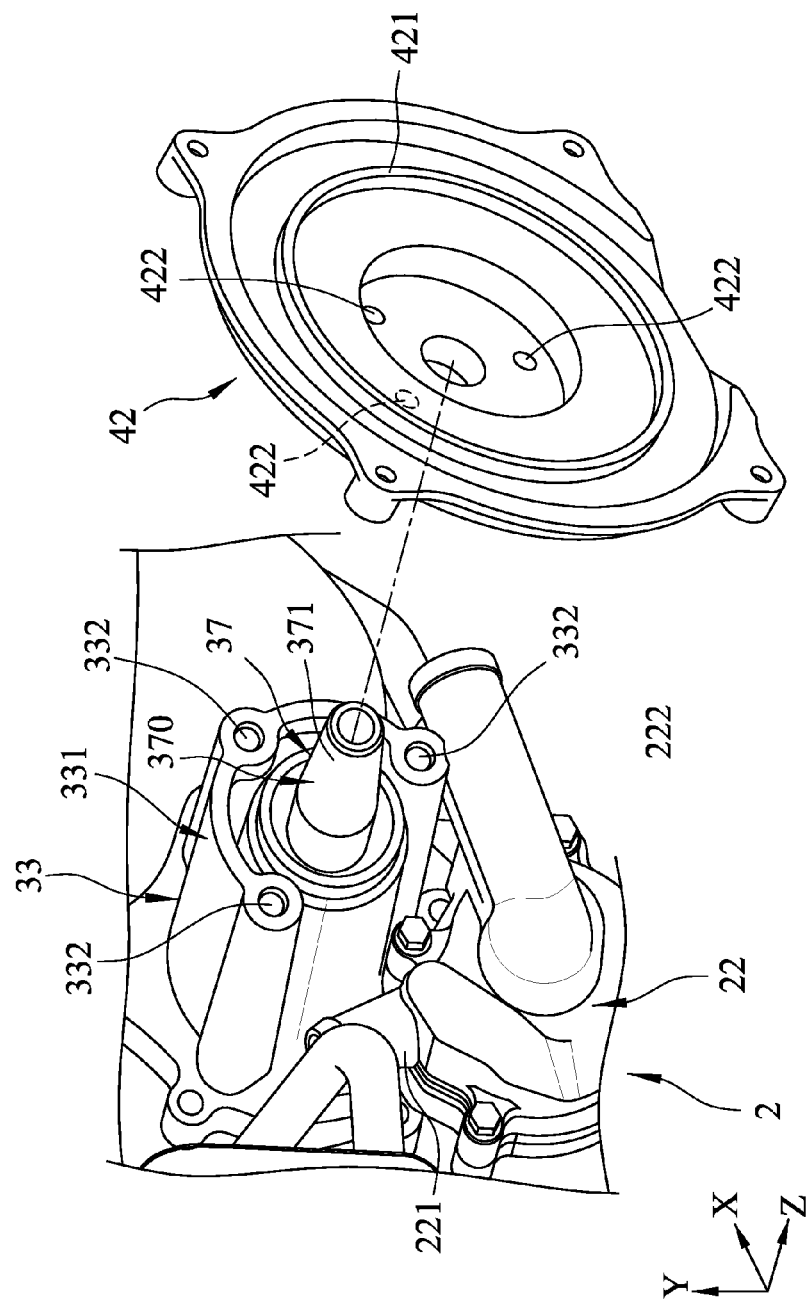
FIG. 4 is a fragmentary, partly exploded, perspective view illustrating a crankshaft-connecting unit and a positioning plate of the embodiment.

Referring from FIG. 2 to FIG. 4, an embodiment of a power generator unit according to the disclosure is illustrated, which is adapted to be installed in a vehicle, more specifically a small utility vehicle, such as a golf cart or a side by side, etc. The vehicle includes a body frame 21, an engine (not shown) that is installed in the body frame 21, a crankshaft 23 that is rotatably installed to the engine and that extends in a left-right direction (Z) of the body frame 21, a pump 22 that is disposed nearby the engine, and a gearbox (not shown) mounted on a side of the engine.

As shown in FIGS. 2 and 3, the power generator unit according to the disclosure is adapted to be installed on another side of the engine opposite to the gearbox, and in the left-right direction (Z). The power generator unit includes a crankshaft-connecting unit 3 adapted to be disposed on the crankshaft 23, a power supply unit 4 connected to the crankshaft-connecting unit 3, and a pin shaft 5 interconnecting the crankshaft-connecting unit 3 and the power supply unit 4.

The crankshaft-connecting unit 3 includes a receiving member 31 adapted to be connected to the body frame 21 and to contain a part of the crankshaft 23, an inner cover 32 covering the receiving member 31 and adapted to contain another part of the crankshaft 23 (i.e. , the crankshaft 23 extends through the inner and outer covers 32, 33), an outer cover 33 covering the inner cover 32 and adapted to contain the rest of the crankshaft 23, a recharge generator 35 located in the inner cover 32 and adapted to be disposed on and actuated by the crankshaft 23, a speed-reduction mechanism 36 disposed between the inner cover 32 and the outer cover 33 and adapted to be actuated by the crankshaft 23, and a transmission shaft 37 adapted to extend in parallel with the crankshaft 23 from the inner cover 32 to the power supply unit 4 and driven rotatably by the speed-reduction mechanism 36. The recharge generator 35 is disposed between the receiving member 31 and the speed-reduction mechanism 36.

As further shown in FIG. 4, the pump 22 of the vehicle 2 has an input pipe 222 extending substantially in a front-rear direction (X) of the body frame 21, and an output pipe 221 extending substantially in an up-down direction (Y) of the body frame 21. The transmission shaft 37 is adapted to be disposed between the input and output pipes 222, 221. Furthermore, the outer cover 33 has a protruding section 331 that protrudes toward the power supply unit 4 and that is formed with three threaded holes 332. The protruding section 331 is adapted to extend around the transmission shaft 37, and is adapted to cooperate with the input and output pipes 222, 221 to surround and protect the transmission shaft 37 thereamong so as to protect the transmission shaft 37 from foreign objects. It should be noted that, in other embodiments, the protruding section 331 may be constructed to completely surround the transmission shaft 37.

Moreover, the transmission shaft 37 has a projecting segment 370 that extends outwardly of the outer cover 33, and that has a portion covered by the power supply unit 4.

As shown in FIG. 3, the power supply unit 4 includes a main shaft 43 that is connected coaxially to the transmission shaft 37, a supply generator 44 that is connected to the main shaft 43 and that is actuated by the main shaft 43, a housing 41 that houses the supply generator 44 and the main shaft 43, a positioning plate 42 that has one end connected rigidly to the housing 41 and an opposite end connected rigidly to the outer cover 33 of the crankshaft-connecting unit 3, and two holders 45 that extend downwardly from the housing 41 and that are adapted to be connected to the body frame 21.

In this embodiment, the portion of the transmission shaft 37 extends into the housing 41 through the positioning plate 42 to be connected coaxially to the main shaft 43. Therefore, the inner cover 32, the outer cover 33, the positioning plate 42 and the housing 41 cooperatively and substantially cover the transmission shaft 37 and the main shaft 43.

In this embodiment, the positioning plate 42 is coupled to the protruding section 331 of the cover member 33, and is formed with three threaded apertures 422 (see FIG. 4) respectively registered with the thread holes 332 and adapted for extension of three threaded fasteners 423 (only two are visible in FIG. 3) therethrough into the threaded holes 332, respectively. Likewise, the positioning plate 42 is connected fixedly to the housing 41 with fasteners.

Figure 5:
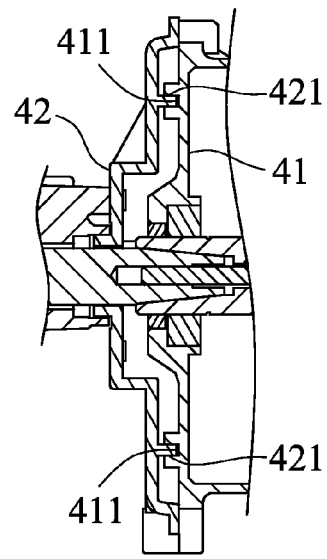
FIG. 5 is a fragmentary front sectional view illustrating a varied example of a connection between the positioning plate and a housing in the embodiment.
Figure 6:
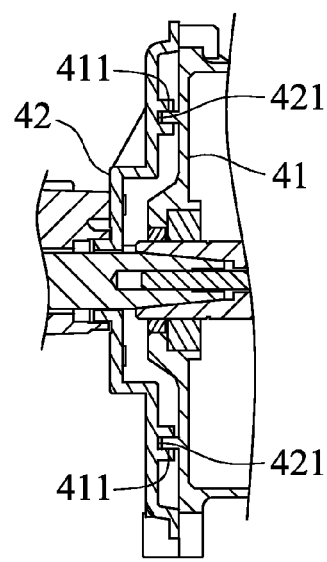
FIG. 6 is a fragmentary front sectional view illustrating another varied example of the connection between the positioning plate and a housing in the embodiment.

The housing 41 has a ring-shaped engaging portion 411 that protrudes toward said positioning plate 42. The positioning plate 42 has a ring-shaped coupling portion 421 that protrudes toward the housing 41 and that is connected to the engaging portion 411. In this embodiment, referring to FIG. 3, the coupling portion 421 has a diameter slightly larger than that of the engaging portion 411, so that the coupling portion 421 is in frictional contact with the engaging portion 411 to receive and secure the engaging portion 411 therein. FIGS. 5 and 6 illustrate two variations of the engagement between the housing 41 and the positioning plate 42. Referring to FIG. 5, the engaging portion 411 of the housing 41 is formed to be a ring-shaped recess, and the coupling portion 421 of the positioning plate 42 is formed as a protrusion engaging the engaging portion 411 of the housing 41. As shown in FIG. 6, the engaging portion 411 of the housing 41 protrudes toward the positioning plate 42, and the coupling portion 421 of positioning plate 42 is formed as a ring-shaped recess engaged with the protruding engaging portion 411 of the housing 41. By virtue of the variations, the housing 41 and the positioning plate 42 are locked together more securely.

Figure 7:
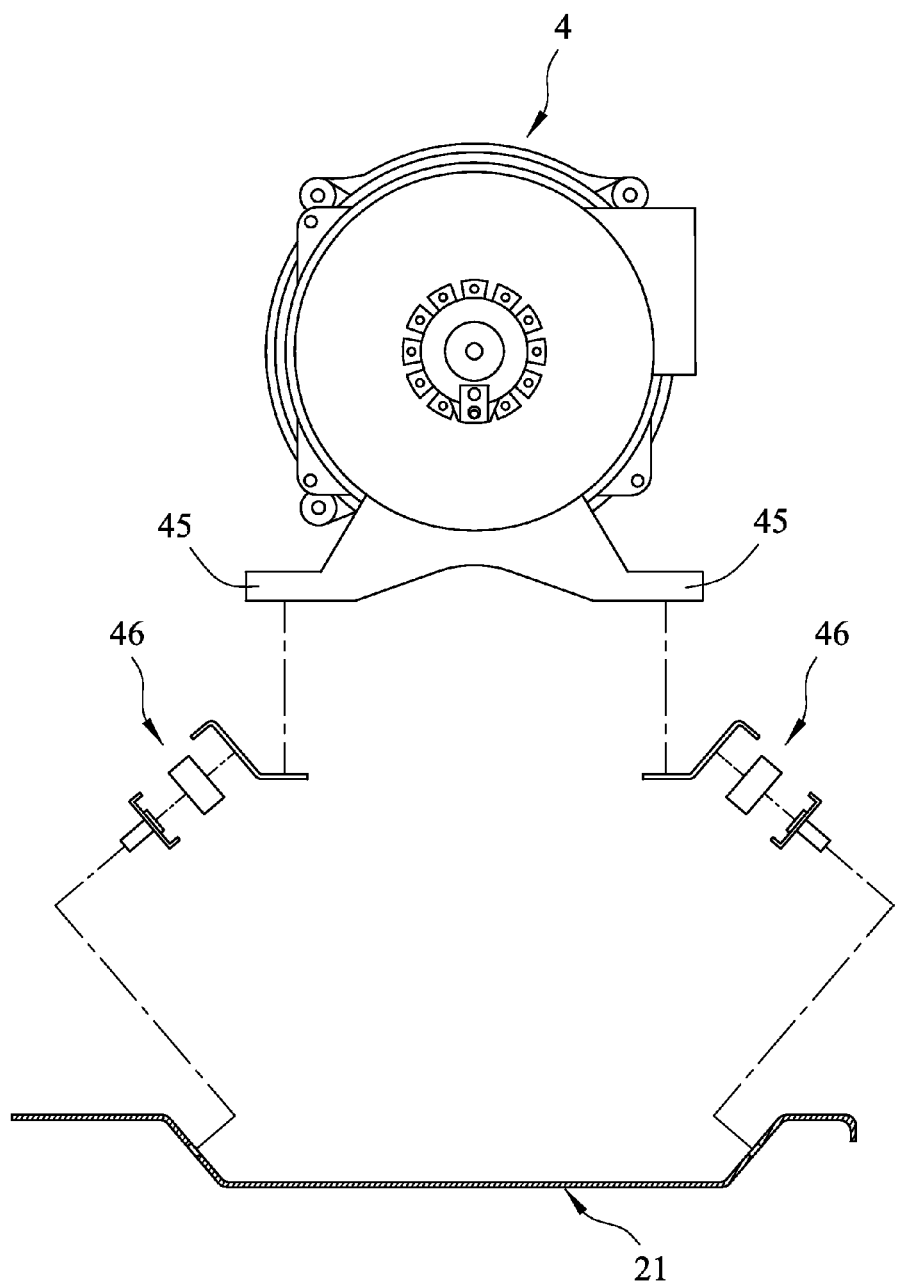
FIG. 7 is a side view of a power supply unit of the embodiment being connected to a body frame of the vehicle.

As shown in FIG. 2, the holders 45 aid to distribute the weight of the power supply unit 4 on the body frame 21. Moreover, since the crankshaft-connecting unit 3 and the power supply unit 4 are respectively connected to different portions of the body frame 21, the weight of the power generator unit is evenly distributed on the body frame 21, thereby facilitating weight reduction for the body frame 21. Moreover, referring to FIG. 7, the power supply unit 4 may further include two cushion members 46 adapted to be mounted on the body frame 21 and respectively connected to the holders 45 for preventing damage from shock and vibrations.

As shown in FIG. 3, the projecting segment 370 of the transmission shaft 37 has a connecting part 371. The main shaft 43 has a connecting portion 431 connected coaxially to the connecting part 371 of the transmission shaft 37. The connecting part 371 is frustoconical and converges away from the outer cover 33. The connecting portion 431 is formed as a frustoconical recess that converges away from the outer cover 33. The connecting portion 431 has a depth in the left-right direction (Z) of the body frame 21 larger than a length of the connecting part 371 in the left-right direction (Z) of the body frame 21 to ensure a complete insertion of the connecting part 371. Furthermore, a diameter of the connecting part 371 is slightly larger than that of the connecting portion 431, such that the connecting part 371 is inserted tightly into the connecting portion 431. With the pin shaft 5 inserted through the main shaft 43 and into the connecting part 371 of the transmission shaft 37, the connection between the main shaft 43 and the transmission shaft 37 is further secured. It should be noted that, the configurations of the main shaft 43 and the transmission shaft 37 may be interchanged as long as the inserting connecting portion 431 can be inserted into the connecting part 371.

As shown in FIGS. 2 and 3, the speed-reduction mechanism 36 is obliquely disposed instead of being disposed to extend in the up-down direction (Y) of the body frame 21, thus an overall height of the entire power generator unit according to this disclosure in the up-down direction (Y) of the body frame 21 is reduced so that the recharge generator 35 and the supply generator 44 are substantially arranged in the left-right direction (Z) of the body frame 21.

In an operation of the power generator unit according to the disclosure, when the engine is started, the crankshaft 23 is turned to actuate the recharge generator 35 of the crankshaft-connecting unit 3 for providing electric power to an inner system of the vehicle 2. Meanwhile, the speed-reduction mechanism 36 is also driven by the crankshaft 23 to turn the main shaft 43 of the power supply unit 4, which actuates the supply generator 44 for providing extra electric power for external electronic devices.

In the installation of the power generator unit according to the disclosure, the positioning plate 42 serves to correct a concentricity between the transmission shaft 37 and the main shaft 43. Moreover, by virtue of the engagement between the transmission shaft 37 and the main shaft 43, that one of the transmission shaft 37 and the main shaft 43 is tightly inserted into the other one of the transmission shaft 37 and the main shaft 43, a coupling (which is conventionally used for connecting two shafts together) is no longer required. Thus, the power generator unit according to the disclosure is convenient for assembly and installation, and is also able to prevent undesirable vibrations and noises caused by loose connection during operation.

Furthermore, because the recharge generator 35 and the supply generator 44 are disposed on the same side of the receiving member 31 of the crankshaft-connecting unit 3 opposite to the gearbox of the vehicle 2, an overall weight distribution on the body frame 21 can be even and balanced. Moreover, since the entire power generator unit according to the disclosure is completely disposed on the same side of the receiving member 31, it is also convenient to perform specific procedures on the power generator unit, such as that for shielding the recharge generator 35 and the supply generator 44 from magnetic/electric interference.

In a summary view of the foregoing embodiment, due to the fact that the crankshaft-connecting unit 3 and the power supply unit 4 are all arranged on the same side of the engine and substantially in the left-right direction (Z) of the body frame 21, the entire power generator unit according to the disclosure possesses a compact short height, which allows for vehicle seats (not shown) to be set relatively low and improves space utilization of small-sized utility vehicles. Moreover, by virtue of the connection among the positioning plate 42, the connecting part 371 of the transmission shaft 37 and the connecting portion 431 of the main shaft 43, the transmission shaft 37 and the main shaft 43 can be easily and securely connected together without the use of any couplings.

While the present invention has been described in connection with what is considered the exemplary embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power generator unit for a vehicle, the vehicle including a body frame and a crankshaft that extends in a left-right direction of the body frame, said power generator unit comprising:
    a crankshaft-connecting unit that includes
        a recharge generator adapted to be disposed on and actuated by the crankshaft, and
        a transmission shaft adapted to extend in parallel with and be driven rotatably by the crankshaft; and
    a power supply unit that is connected to said crankshaft-connecting unit,
    said crankshaft-connecting unit and said power supply unit being adapted to be arranged substantially in the left-right direction of the body frame,
    said power supply unit including a main shaft that is connected coaxially to said transmission shaft, and a supply generator that is connected to said main shaft and that is actuated by said main shaft, a portion of said transmission shaft being covered by said power supply unit.

2. The power generator unit as claimed in claim 1, wherein:
    said crankshaft-connecting unit further includes a receiving member adapted to be connected to the body frame, an inner cover covering said receiving member, an outer cover covering said inner cover, and a speed-reduction mechanism disposed between said inner cover and said outer cover and adapted to be actuated by the crankshaft;
    said receiving member and said inner cover are adapted for extension of the crankshaft therethrough;
    said recharge generator is disposed between said receiving member and said speed-reduction mechanism; and
    said transmission shaft is driven rotatably by said speed-reduction mechanism, and has a projecting segment that extends outwardly of said outer cover and that has at least a portion covered by said power supply unit.

3. The power generator unit as claimed in claim 2, wherein:
    said power supply unit further includes
        a housing that houses said supply generator and said main shaft, and
        a positioning plate that has one end connected rigidly to said housing, and an opposite end connected rigidly to said outer cover of said crankshaft-connecting unit;
    said at least a portion of said projecting segment of said transmission shaft extends into said housing through said positioning plate and is connected coaxially to said main shaft; and
    said inner cover, said outer cover, said positioning plate and said housing cooperatively and substantially cover said transmission shaft and said main shaft.

4. The power generator unit as claimed in claim 3, wherein:
    said power supply unit further includes a plurality of holders extending downwardly from said housing and adapted to be connected to the body frame; and
    said recharge generator and said supply generator are arranged in a direction parallel to an axis of said transmission shaft, and are disposed at the same side of said receiving member of said crankshaft-connecting unit.

5. The power generator unit as claimed in claim 3, wherein:
    said housing of said power supply unit has a ring-shaped engaging portion that protrudes toward said positioning plate; and
    said positioning plate has a coupling portion that protrudes toward said housing and that is connected to said engaging portion of said housing.

6. The power generator unit as claimed in claim 3, wherein:
    said housing of said power supply unit has a ring-shaped engaging portion that protrudes toward said positioning plate; and
    said positioning plate has a ring-shaped coupling portion that is formed as a recess engaged with said engaging portion of said housing.

7. The power generator unit as claimed in claim 3, wherein:
    said housing of said power supply unit has a ring-shaped engaging portion that is formed as a recess; and
    said positioning plate has a ring-shaped coupling portion that is formed as a protrusion engaging said engaging portion of said housing.

8. The power generator unit as claimed in claim 3, wherein:
    said outer cover of said crankshaft-connecting unit has a protruding section extending around said transmission shaft, protruding toward said power supply unit, and formed with a plurality of threaded holes; and
    said positioning plate is coupled to said protruding section of said cover member, and is formed with a plurality of threaded apertures respectively registered with said thread holes, and adapted for extension of a plurality of fasteners therethrough into said threaded holes, respectively.

9. The power generator unit as claimed in claim 2, wherein:
    said projecting segment of said transmission shaft has a connecting part;
    said main shaft of said power supply unit has a connecting portion connected coaxially to said connecting part of said projecting segment of said transmission shaft;
    said connecting part is frustoconical and converging away from said outer cover;

said connecting portion of said main shaft is formed as a frustoconical recess that converges away from said outer cover;

a diameter of said connecting part is slightly larger than that of said connecting portion such that said connecting part is inserted tightly into said connecting portion; and said connecting portion has a depth larger than a length of said connecting part.

10. The power generator unit as claimed in claim 2, wherein:

said projecting segment of said transmission shaft has a connecting part;

said main shaft of said power supply unit has a connecting portion connected coaxially to said connecting part of said projecting segment of said transmission shaft;

said connecting part is formed as a frustoconical recess that converges toward said outer cover;

said connecting portion of said main shaft is frustoconical and converging toward said outer cover;

a diameter of said connecting portion is slightly larger than that of said connecting part such that said connecting portion is inserted tightly into said connecting part; and said connecting part has a depth larger than a length of said connecting portion.

* * * * *